United States Patent
Bonefas

(10) Patent No.: US 9,119,342 B2
(45) Date of Patent: Sep. 1, 2015

(54) METHODS FOR IMPROVING THE ROBUSTNESS OF AN AUTOMATED UNLOADING SYSTEM

(71) Applicant: Deere & Company, Moline, IL (US)

(72) Inventor: Zachary T. Bonefas, Urbandale, IA (US)

(73) Assignee: Deere & Company, a Delaware Corporation, Moline, IL (US)

( * ) Notice: Subject to any disclaimer, the term of this patent is extended or adjusted under 35 U.S.C. 154(b) by 0 days.

(21) Appl. No.: 14/258,346

(22) Filed: Apr. 22, 2014

(65) Prior Publication Data

US 2014/0311113 A1     Oct. 23, 2014

Related U.S. Application Data

(60) Provisional application No. 61/814,402, filed on Apr. 22, 2013.

(51) Int. Cl.
| | |
|---|---|
| G06F 7/70 | (2006.01) |
| A01D 34/00 | (2006.01) |
| A01D 57/00 | (2006.01) |
| A01D 75/02 | (2006.01) |
| A01D 41/12 | (2006.01) |
| A01D 41/127 | (2006.01) |
| A01D 43/073 | (2006.01) |

(52) U.S. Cl.
CPC ............ *A01D 34/008* (2013.01); *A01D 34/001* (2013.01); *A01D 41/1217* (2013.01); *A01D 41/1275* (2013.01); *A01D 43/073* (2013.01); *A01D 57/00* (2013.01); *A01D 75/02* (2013.01)

(58) Field of Classification Search
USPC .......................................... 701/50; 56/1–473.5
See application file for complete search history.

(56) References Cited

U.S. PATENT DOCUMENTS

| | | | |
|---|---|---|---|
| 5,524,424 A | 6/1996 | Halgrimson et al. | |
| 5,575,316 A | 11/1996 | Pollklas | |
| 5,749,783 A | 5/1998 | Pollklas | |
| 6,339,917 B1 * | 1/2002 | Dillon et al. | 56/14.6 |
| 6,591,145 B1 | 7/2003 | Hoskinson et al. | |
| 6,594,979 B2 * | 7/2003 | Krone et al. | 56/16.6 |
| 7,062,381 B1 | 6/2006 | Rekow et al. | |
| 7,198,449 B2 * | 4/2007 | Dillon | 414/502 |
| 7,648,413 B2 | 1/2010 | Duquesne et al. | |

(Continued)

FOREIGN PATENT DOCUMENTS

| | | |
|---|---|---|
| EP | 1574122 A1 | 9/2005 |
| WO | 2011101458 A1 | 8/2011 |

(Continued)

OTHER PUBLICATIONS

United Kingdom Search and Examination Report under Sections 17 and 18(3) for Application No. GB1407080.9 dated Oct. 13, 2014.

(Continued)

*Primary Examiner* — Thomas G Black
*Assistant Examiner* — Tyler Paige
(74) *Attorney, Agent, or Firm* — David G. Oberdick

(57) ABSTRACT

System utilizes stereo cameras to sense the position of a tractor-drawn grain cart relative to a combine during the unloading (on-the-go) process. The sensing system also detects the fill level of grain in the cart and adjusts the relative position of the tractor to the combine to achieve an even fill to the desired fill level.

25 Claims, 12 Drawing Sheets

(56) References Cited

U.S. PATENT DOCUMENTS

| | | |
|---|---|---|
| RE42,036 E * | 1/2011 | Dillon .......................... 280/419 |
| 8,060,283 B2 | 11/2011 | Mott et al. |
| 8,126,620 B2 * | 2/2012 | Ringwald et al. ............... 701/50 |
| 8,160,765 B2 | 4/2012 | Morselli et al. |
| 8,649,940 B2 | 2/2014 | Bonefas |
| 8,868,304 B2 * | 10/2014 | Bonefas ......................... 701/50 |
| 2003/0010004 A1 * | 1/2003 | Krone et al. ............... 56/10.2 G |
| 2003/0174207 A1 | 9/2003 | Alexia et al. |
| 2007/0003107 A1 | 1/2007 | Wei et al. |
| 2009/0044505 A1 * | 2/2009 | Huster et al. ............... 56/10.2 R |
| 2010/0274452 A1 * | 10/2010 | Ringwald et al. ............... 701/50 |
| 2011/0061762 A1 | 3/2011 | Madsen et al. |
| 2012/0215394 A1 | 8/2012 | Wang et al. |
| 2012/0215409 A1 * | 8/2012 | Wang et al. ..................... 701/50 |
| 2013/0211658 A1 * | 8/2013 | Bonefas ......................... 701/28 |
| 2013/0211675 A1 | 8/2013 | Bonefas |

FOREIGN PATENT DOCUMENTS

| | | |
|---|---|---|
| WO | 2013-120062 A1 | 8/2013 |
| WO | 2014-116819 A1 | 7/2014 |

OTHER PUBLICATIONS

International Search Report and Written Opinion of the International Searching Authority for PCT Application No. PCT/US2013/052262 dated Dec. 6, 2013.

* cited by examiner where  $H_p$ = Height of rotational pivot point
$A = H_b @ \varphi_i - H_t$
$B = H_t - H_p$
Lateral Offset$_{min}$ = $B/\tan \theta$

METHODS FOR IMPROVING THE ROBUSTNESS OF AN AUTOMATED UNLOADING SYSTEM

CROSS-REFERENCE TO RELATED APPLICATIONS

This application claims priority to U.S. Provisional Application Ser. No. 61/814,402, titled METHODS FOR IMPROVING THE ROBUSTNESS OF AN AUTOMATED UNLOADING SYSTEM, filed Apr. 22, 2013, incorporated by reference herein in its entirety.

BACKGROUND OF THE INVENTION

During the unloading process, a tractor operator pulling a grain cart will generally attempt to match the speed of the combine as it harvests to optimize efficiency. This can sometimes be difficult to do, especially for inexperienced tractor operators. Sometimes, the tractor operator will set a constant speed (below the optimal speed for harvesting) while unloading, and the harvesting vehicle (combine or forage harvester) operator will adjust the relative position between the vehicles by increasing or decreasing the speed of the combine. The unloading operation requires much more precision as the grain cart begins to fill up. The objective is for the tractor and harvesting vehicle operators to choreograph their movements to achieve an even fill of the grain cart. This invention automates this interaction by, for example, calculating the auger position, relative position of the cart and harvesting vehicle, and point of incidence of the crop into the cart based on sensing where the grain is being unloaded into the grain cart, sensing and profiling the fill level of the grain cart, and executing a strategy to fill the cart evenly to a desired fill level.

Sometimes, there are circumstances in which it is difficult or impossible for the system to sense the relative position between the harvesting vehicle and the grain cart, and therefore, where the grain is being unloaded into the grain cart. There are several techniques that can be utilized to mitigate the negative impact to the system when such circumstances arise.

BRIEF DESCRIPTION OF THE DRAWINGS

For the present invention to be easily understood and readily practiced, the invention will now be described, for the purposes of illustration and not limitation, in conjunction with the following figures, wherein.

DETAILED DESCRIPTION OF THE INVENTION

Figure 8:
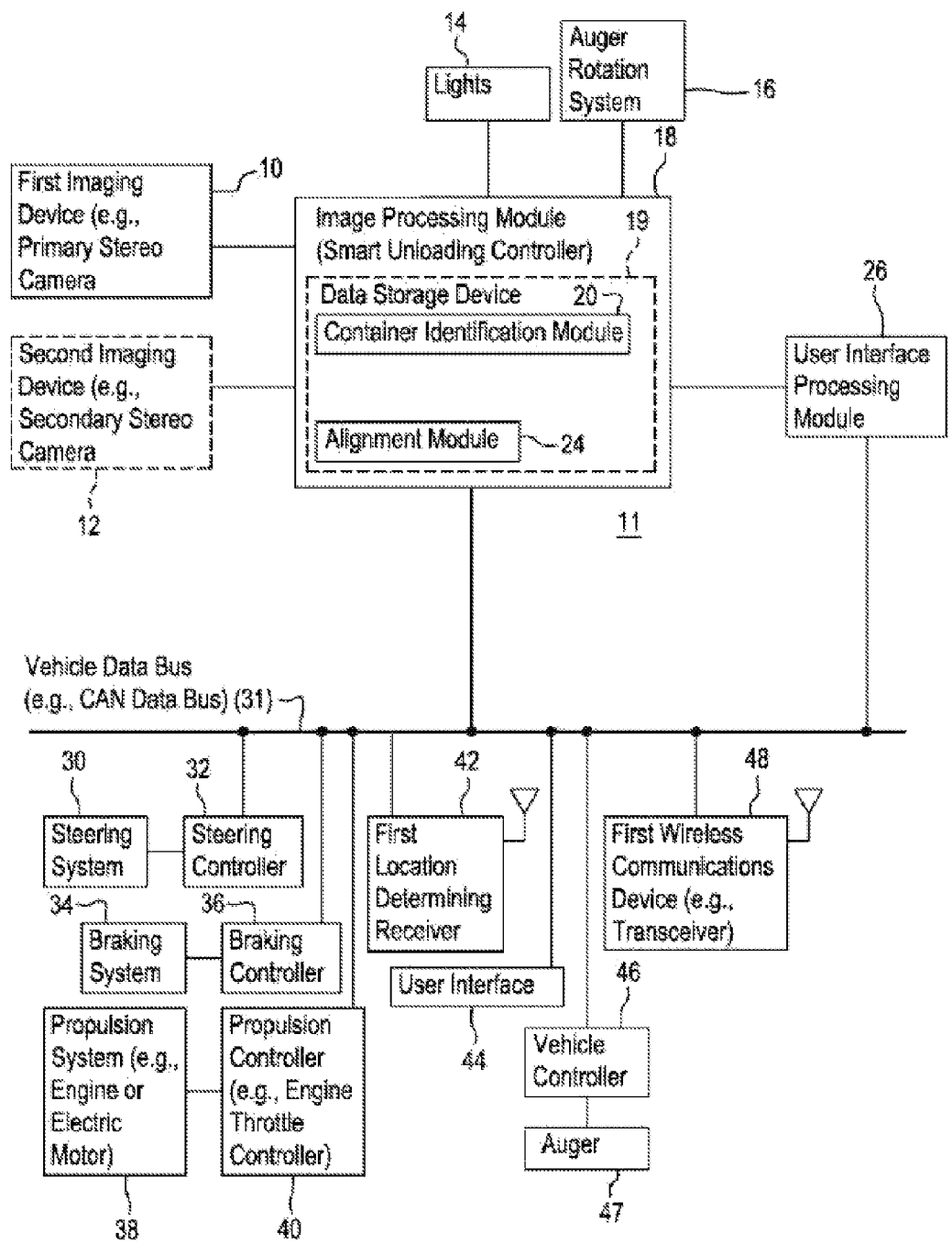
FIG. 8 is a block diagram of one embodiment of a stereo vision system for a harvesting vehicle for managing the unloading of agricultural material from the harvesting vehicle (e.g., combine)

In accordance with one embodiment, FIG. 8 shows a system 11 for a harvesting vehicle for managing the unloading of agricultural material from the harvesting vehicle (also referred to herein as a transferring vehicle, a combine, a harvester, and a self-propelled forage harvester) to a receiving vehicle (also referred to herein as a tractor, propelled portion, trailer, grain cart, cart, storage portion, container, or wagon). In one embodiment, the system 11 comprises a first imaging device 10 and second imaging device 12 coupled to an image processing module 18. The first imaging device 10 may comprise a primary stereo camera, while the second imaging device 12 may comprise a secondary stereo camera. For example, the first imaging device 10 or the second imaging device 12 is mounted at sufficiently high elevation above ground level to have some visibility into the storage container 4 (e.g., grain cart), or sufficient visibility of the interior of the storage container 4 and its contents, to determine a profile, distribution or level of agricultural material (e.g., grain) within a volume or portion of the volume defined by the container 4.

The image processing module 18 may be coupled, directly or indirectly, to lights 15 on a vehicle (e.g., harvesting vehicle) for illumination of a storage container and/or spout discharge end (e.g., 13A in FIG. 1), or for illumination of a field of view of the first imaging device 10, the second imaging device 12, or both for acquiring raw images (e.g., of sufficient brightness, contrast and color reproduction). For example, the image processing module 18 may control drivers or switches, which in turn control the activation or deactivation of lights 15 on the harvesting vehicle. The image processing module 18 may activate the lights 15 on the vehicle for illumination of the storage container (e.g., 4 in FIG. 1), spout discharge end (e.g., 13A in FIG. 1) or both if a light meter indicates that an ambient light level is below a certain minimum threshold. In one configuration, the light meter comprises a photo-sensor, photo-resistor, photo-sensitive device, or a cadmium-sulfide cell. The spout also includes a length and a rotational end pivotally connected to the transferring vehicle allowing the spout to rotate about a vertical axis of rotation.

In one embodiment, the auger rotation system 16 may comprise: (1) a rotation angle sensor for sensing a spout rotation angle (e.g., $\phi$ in FIG. 1) or other spout angles of the spout/auger 47 with respect to one or more axes of rotation and (2) an actuator for moving the spout/auger 47 to change the spout rotation angle $\phi$ or other spout angles; hence, the spout position with respect to the receiving vehicle 6 or its storage container 4. The actuator of the auger rotation system 16 may comprise one or more motors, a linear motor, an electro-hydraulic device, a ratcheting or cable-actuated mechanical device, or another device for moving the spout 89, or the spout discharge end 87. The spout angle or spout rotation angle φ may comprise a simple angle, a compound angle or multi-dimensional angles that are measured with reference to any of the following: a reference axis parallel to the direction of travel of the harvesting vehicle, a generally vertical axis, a generally horizontal axis, or an axis generally orthogonal to at least one of the generally vertical axis and the generally horizontal axis.

Where the system 11 of FIG. 8 is applied to a combine or a harvester, the spout/auger 47 may be controlled in one or more dimensions (e.g., of rotation or movement). In one configuration, the auger rotation system 16 (of the harvester or combine) controls a rotation angle φ of the spout/auger 47 in a generally horizontal plane or about a generally vertical axis. In another configuration, the auger rotation system 16 or spout controller may control one or more of the following angles: (1) rotation angle φ of the spout in a generally horizontal plane, (2) tilt angle in a relatively vertical plane, and (3) flap angle (e.g., forage harvester), where the rotation angle, tilt angle and flap angle are associated with mutually orthogonal axes. In one configuration, by controlling the rotation angle, the vehicle controller (e.g., 46 of FIG. 8, 54 of FIG. 9) may automatically extend or retract the spout/auger 47 (e.g., unloading auger arm) when appropriate (e.g., when unloading of the agricultural material is complete).

The vehicle controller 46 controls the rotation of the auger 47 for transfer or movement of the agricultural material from the harvesting vehicle 2 to the receiving vehicle 6. The vehicle controller 46 can provide a data message that indicates when the auger 47 for unloading agricultural material from the harvesting vehicle is activate and inactive. The auger 47 may comprise an auger, an electric motor for driving the auger, and a rotation sensor for sensing rotation of the auger or its associated shaft. In one embodiment, the auger 47 is associated with a container for storing agricultural material (e.g., a grain tank) of a harvesting vehicle 2 (e.g., a combine).

If the image processing module 18 or another sensor determines that the container 4 has reached a target fill level (e.g., full or some percentage or fraction of capacity), the image processing module 18, vehicle controller 46, or auger rotation system 16 may automatically shut off the unloading auger 47.

The imaging processing module 18 may comprise a controller, a microcomputer, a microprocessor, a microcontroller, an application specific integrated circuit, a programmable logic array, a logic device, an arithmetic logic unit, a digital signal processor, or another data processor and supporting electronic hardware and software.

In one embodiment, the image processing module 18 comprises a container identification module 20, and an alignment module 24.

The image processing module 18 may be associated with a data storage device 19. The data storage device 19 may comprise electronic memory, non-volatile random access memory, a magnetic disc drive, an optical disc drive, a magnetic storage device or an optical storage device, for example. If the container identification module 20 and the alignment module 24 are software modules they are stored within the data storage device 19.

The container identification module 20 identifies a set of two-dimensional or three dimensional points (e.g., in Cartesian coordinates or Polar coordinates) in the real world that define at least a portion of the container perimeter (e.g., front edge or rear edge) of the storage portion (e.g., cart 4 in FIG. 1). The set of two-dimensional or three dimensional points correspond to pixel positions in images collected by the first imaging device 10, the second imaging device 12, or both. The container identification module 20 may use or retrieve container reference data.

The container reference data comprises one or more of the following: reference dimensions, reference shape, drawings, models, layout, and configuration of the container 4, such as the container perimeter, the container edges; reference dimensions, reference shape, drawings, models, layout, and configuration of the entire storage portion 4 of receiving vehicle 6; storage portion wheelbase, storage portion turning radius, storage portion hitch configuration of the storage portion 4 of the receiving vehicle 6. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the harvesting vehicle system 11. For each receiving vehicle identifier, there can be a corresponding unique container reference data stored therewith in the data storage device 19.

In one embodiment, the harvesting vehicle 2 receives a data message from the receiving vehicle 6 in which a vehicle identifier of the receiving vehicle is regularly (e.g., periodically transmitted). In another embodiment, the harvesting vehicle 2 interrogates the receiving vehicle 6 for its vehicle identifier or establishes a communications channel between the harvesting vehicle 2 and the receiving vehicle 6 in preparation for unloading via the wireless communication devices (48, 148). In yet another embodiment, the receiving vehicle 6 transmits its vehicle identifier to the harvesting vehicle 2 when the receiving vehicle 6 approaches the harvesting vehicle 2 within a certain radial distance. In still another embodiment, only one known configuration of receiving vehicle is used with a corresponding harvesting vehicle and the container reference data is stored or saved in the data storage device 20. In the latter embodiment, the harvesting vehicle 2 is programmed, at least temporarily, solely for receiving vehicles with identical containers, which are identical in dimensions, capacity, proportion and shape.

If the linear orientation of a set of pixels in the collected image data conforms to one or more edges of the perimeter of cart 4 as prescribed by the container reference data, the position of the container has been identified. A central region or central zone of the container opening of the container 4 can be identified by dividing the distance (e.g., shortest distance or surface normal distance) between opposite sides of the container, or by identifying corners of the container and where diagonal lines that intercept the corners intersect, among other possibilities.

The alignment module 24 estimates motion commands at regular intervals to maintain alignment of the spout discharge end 13A over the target of the container 4 for unloading agricultural material. The alignment module 24 may send commands to the harvesting vehicle 2 with respect to its speed, velocity or heading to maintain alignment of the position of the harvesting vehicle with respect to the receiving vehicle. For example, the alignment module 24 may transmit a steering command or heading command to the steering controller 32, a braking or deceleration command to a braking system 34, and a propulsion, acceleration or torque command to a propulsion controller 40. Further, similar command data may be transmitted via the wireless communication devices (48, 148) to the receiving vehicle 6 for observational purposes or control of the receiving vehicle via its steering system controller 32, its braking controller 36.

The propulsion controller 40 may facilitate an even distribution of agricultural material in the container 4 by acceleration or deceleration of the receiving vehicle 6 or its propulsion portion 75 to redistribute evenly or move the agricultural material in the container 4. In one example, a propulsion controller 40 temporarily increases its ground speed, or alternately a relative speed of the receiving vehicle 6 relative to the harvesting vehicle 2, if an image processing module 18 senses that a front volume of the storage portion is currently filled to a target level (with agricultural material) or until the entire cart 4 reaches the target fill level. Conversely, propulsion controller 40 temporarily decreases its ground speed, or alternately a relative speed of the receiving vehicle relative to the harvesting vehicle, if an image processing module 18 senses that a rear volume of the storage portion is currently filled (with agricultural material) to a target level or until the entire storage portion 93 reaches the target fill level.

The image processing module 18 provides image data to a user interface processing module 26 that provides, directly or indirectly, status message data and performance message data to a user interface 44. As illustrated in FIG. 8, the image processing module 18 communicates with a vehicle data bus 31 (e.g., Controller Area Network (CAN) data bus).

In one embodiment, a location determining receiver 42, a first wireless communications device 48, a vehicle controller 46, a steering controller 32, a braking controller 36, and a propulsion controller 40 are capable of communicating over the vehicle data bus 31. In turn, the steering controller 32 is coupled to a steering system 30 of the harvesting vehicle; the braking controller 37 is coupled to the braking system 34 of the harvesting vehicle; and the propulsion controller 40 is coupled to the propulsion system 38 of the harvesting vehicle.

In one configuration, a user interface 44 is arranged for entering container reference data or dimensional parameters related to the receiving vehicle. For example, the container reference data or dimensional parameters comprise a distance between a trailer hitch (which interconnects the propulsion unit 75 and the storage portion 93) and front wheel rotational axis of the storage portion 93 of the receiving vehicle 6.

The system 11 of FIG. 8 is well suited for use on a combine or harvester as the harvesting vehicle. The system 11 of FIG. 8 may communicate and cooperate with a second system (211 of FIG. 10) on the receiving vehicle 6 to coordinate the relative alignment of the harvesting vehicle 2 and the receiving vehicle 6 during unloading or transferring of material from the harvesting vehicle. Like reference numbers in FIG. 8 and FIG. 9 indicate like elements.

Figure 9:
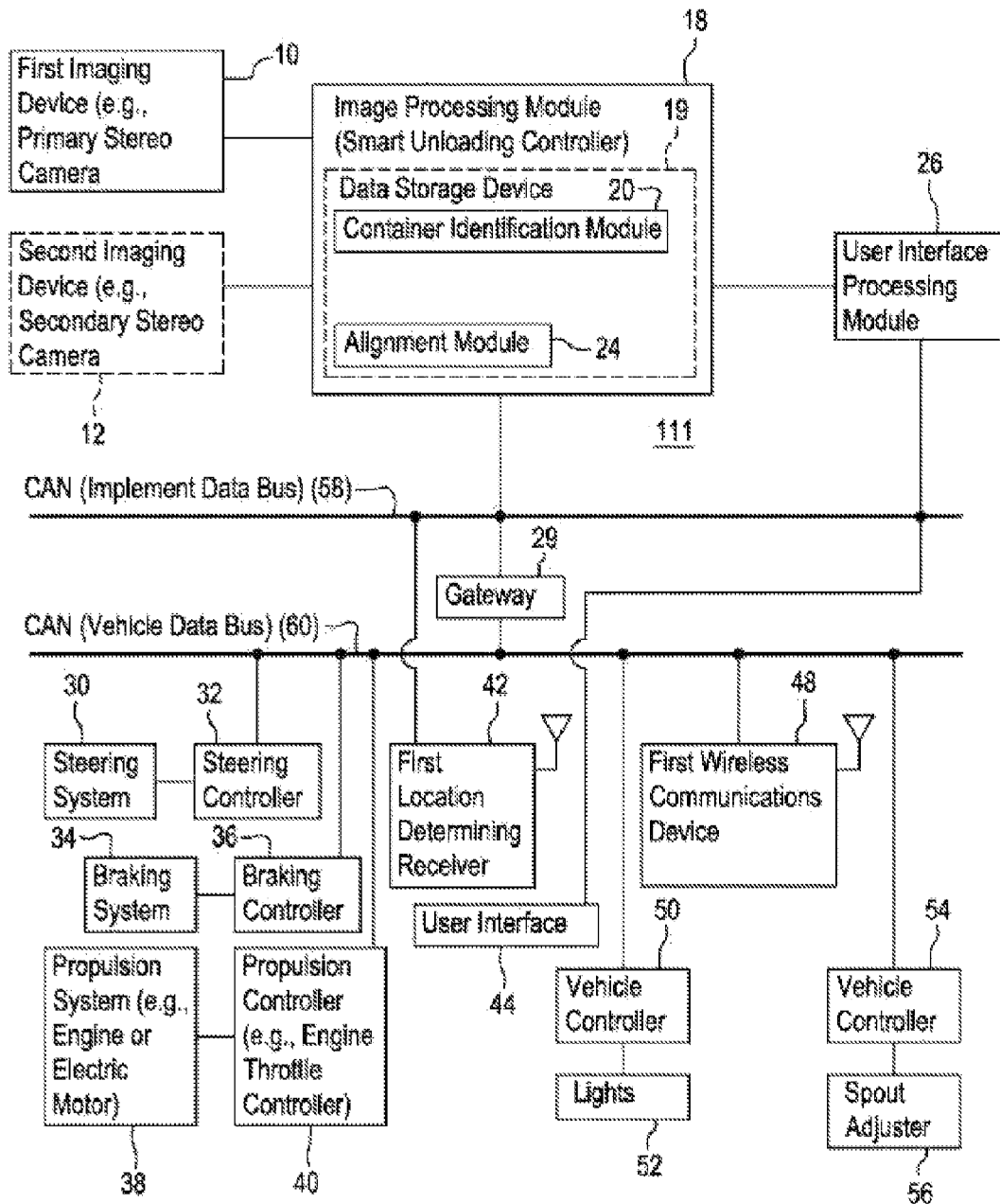
FIG. 9 is a block diagram of another embodiment of a stereo vision system for a harvesting vehicle for managing the unloading of agricultural material from the harvesting vehicle (e.g., a self-propelled forage harvester)

The system 111 of FIG. 9 is similar to the system 11 of FIG. 8; except that the system 111 of FIG. 9 further comprises an implement data bus 58, a gateway 29, and vehicle controllers 50, 54 coupled to the vehicle data bus 60 for the lights 52 and spout adjuster 56. The vehicle controller 50 controls the lights 52; the vehicle controller 54 controls the spout adjuster 56 for moving or adjusting the orientation or angle of the spout or auger 47, or its spout discharge end 13B. The spout adjuster 56 may comprise an actuator for moving or adjusting the spout 89 and one or more sensors for measuring the spout angle, orientation, or position of the spout 89. For instance, the spout adjuster 56 or its actuator may comprise a servo-motor, electric motor, or an electro-hydraulic mechanism for moving or adjusting the spout 89.

Where the system 111 of FIG. 9 is applied to a self-propelled forage harvester, the vehicle controller 54 and spout adjuster 56 may control or adjust spout or auger 47 in multiple dimensions, such as two or three dimensions. For example, the vehicle controller 54 or spout controller may control one or more of the following angles: (1) rotation angle of the spout in a generally horizontal plane, (2) tilt angle in a relatively vertical plane, and (3) flap angle, where the rotation angle, tilt angle and flap angle are associated with mutually orthogonal axes. For a forage harvester, the spout 47 (e.g., unloading auger arm) is not usually retracted and the flow of agricultural material from the spout 89 is generally continuous during harvesting.

If a container 4 of the receiving vehicle 2 is full (or imminently approaching a full state) with agricultural material (e.g., from a transferring operation), as detected by one or more sensors (e.g., mass or optical sensors) on the receiving vehicle 6 for detecting a mass, weight or volume of agricultural material in the container 4; the imaging system 18 of the harvesting vehicle 2 or the sensors of the receiving vehicle via the wireless communications devices 48, 148 may notify the operator (of the harvesting vehicle 2) on the user interface 44 of the full state, fill state or full condition of the container 4. In response to the full state or near full state (e.g., approximately 90 percent or more of full capacity) of the container 4 (e.g., and in the context of a forage harvester as the harvesting vehicle 2), the system 111 of FIG. 9 may: (1) maintain a last position and orientation of the spout 47 to continue to unload agricultural material in the same location, or (2) sweep the spout 47 or spout discharge end 13A back and forth in a continuous or incremental motion to continue to evenly distribute the material in the container 4

In one configuration, the implement data bus 58 may comprise a Controller Area Network (CAN) implement data bus. Similarly, the vehicle data bus 60 may comprise a controller area network (CAN) data bus. In an alternate embodiment, the implement data bus 58, the vehicle data bus 60, or both may comprise an ISO (International Organization for Standardization) data bus or ISOBUS, Ethernet or another data protocol or communications standard.

The gateway 29 supports secure or controlled communications between the implement data bus 58 and the vehicle data bus 60. The gateway 29 comprises a firewall or another security device that may restrict or prevent a network element or device on the implement data bus 58 from communicating (e.g., unauthorized communication) with the vehicle data bus 60 or a network element or device on the vehicle data bus 31, unless the network element or device on the implement data bus 58 follows a certain security protocol, handshake, password and key, or another security measure. Further, in one embodiment, the gateway 29 may encrypt communications to the vehicle data bus 60 and decrypt communications from the vehicle data bus 60 if a proper encryption key is entered, or if other security measures are satisfied. The gateway may allow network devices on the implement data bus 58 that communicate via an open standard or third party hardware and software suppliers, whereas the network devices on the vehicle data bus 60 are solely provided by the manufacturer.

In FIG. 9, a location determining receiver 42, a user interface 44, a user interface processing module 26, and the gateway 29 are coupled to the implement data bus 58. Vehicle controllers 50, 54 are coupled to the vehicle data bus 60. In turn, the vehicle controllers 50, 54 are coupled, directly or indirectly, to lights 15 on the harvesting vehicle and the spout 89 of the harvesting vehicle (e.g., self-propelled forage harvester). Although the system of FIG. 9 is well suited for use or installation on a self-propelled forage harvester, the system of FIG. 9 may also be applied to combines, harvesters or other heavy equipment.

Figure 10:
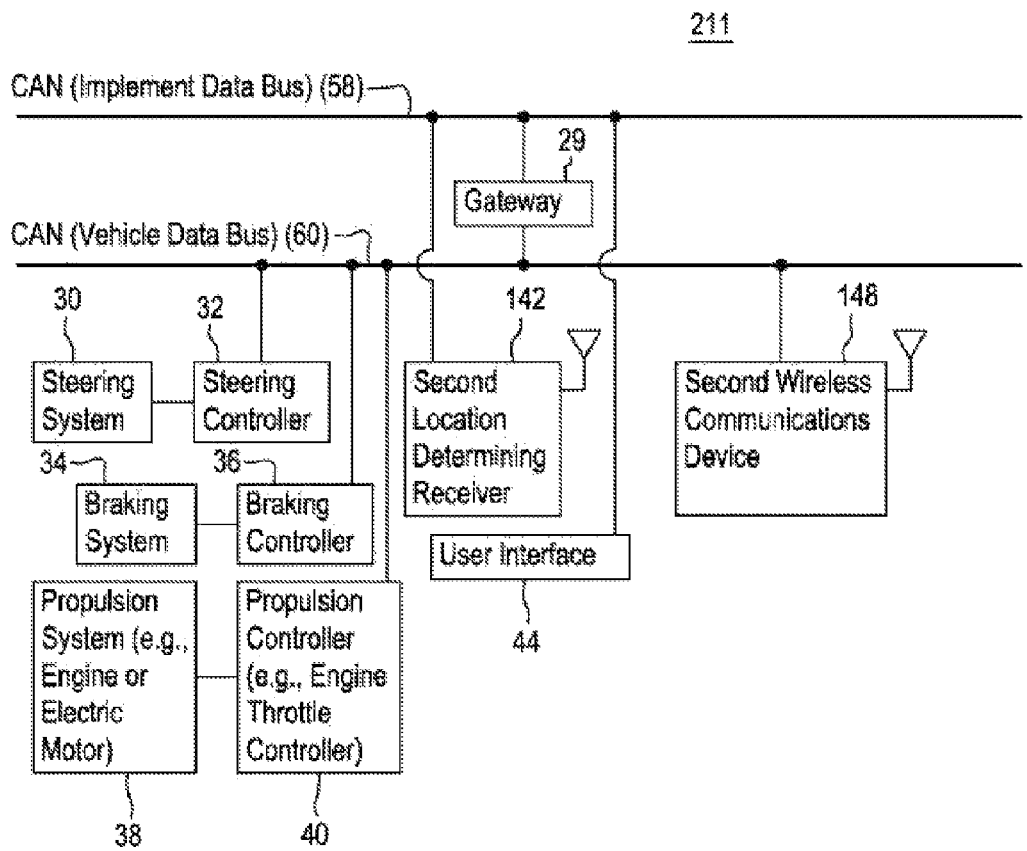
FIG. 10 is a block diagram of an embodiment of a system for a receiving vehicle (without stereo vision) for managing the unloading of agricultural material from a transferring vehicle.

The system 11 of FIG. 8 and the system 111 of FIG. 9 apply to the harvesting vehicle 2, whereas the system of FIG. 10 applies to the receiving vehicle 2. Like reference numbers in FIG. 9 and FIG. 10 indicate like elements. As previously noted, the harvesting vehicle 2 comprises a combine, harvester, self-propelled harvester, vehicle or heavy equipment that collects or harvests material for transfer to the receiving vehicle. In one embodiment, the receiving vehicle 2 comprises a propelled portion (e.g., tracker in FIG. 1) and a storage portion (e.g., 4 in FIG. 1) for storing the material transferred from the harvesting vehicle 2. The receiving vehicle 6 may comprise the combination of a tractor and a grain cart or wagon, where the tractor is an illustrative example of the propelled portion 6 and where the grain cart is an illustrative example of the storage portion 4. In one embodiment, FIG. 10 illustrates a propelled portion (e.g., tractor) without a first imaging device 10 or a second imaging device 12 on the propelled portion 75. Like reference numbers in FIG. 9 and FIG. 10 indicate like elements.

The system 211 of FIG. 10 is similar to the system of FIG. 9, except the system of FIG. 10 deletes the first imaging device 10, the second imaging device 12, the image processing module 18, the user interface 44, the user interface processing module 26, the vehicle controllers 50, 54, the lights 52 and spout 56 from FIG. 9. The system 211 of FIG. 10 comprises a second wireless communications device 148 for communicating with the first communications device 48 of FIG. 8 or FIG. 9, for example. The wireless devices 48, 148 may exchange or communicate position date, relative position data, command data, or control data for controlling, adjusting or coordinating the position and orientation of the vehicles; more particularly, the position and the orientation of the spout 47 or spout discharge end 13A over the opening of the container 4. The second wireless communications device 148 is coupled to the vehicle data bus 31. In FIG. 10, the system 211 for a receiving vehicle 6 can be used in conjunction with the system (11 or 111) of the harvesting vehicle 2 of FIG. 8 or FIG. 9.

The image processing module 18 estimate a distance or range from the first imaging device 10, the second imaging device 12, or both to the pixels or points lying on the container perimeter or on the container edge. For example, the image processing module 18 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

For example, the system 11,111, 211 executes a container filling strategy by changing the relative speed, velocity or acceleration of the harvesting vehicle and receiving vehicle (e.g., through the ISO Class 3 interface) to promote even or uniform filling of the container 4. As an illustrative example, for a "front-to-back" fill strategy, the system 11, 111, 211 has the receiving vehicle generally maintain a constant fore/aft distance relative to the harvesting vehicle (e.g., combine) such that the agricultural material is filling the front volume of the cart and putting weight on the tongue of the connection between the propulsion portion 6 and the storage portion. When the front volume of the container 4 becomes full or attains a target volume or mass of agricultural material, the system 11, 111, 211 can command the receiving vehicle to temporarily increase its speed or velocity, or accelerate, relative to the ground (or relative to the harvesting vehicle) via the propulsion controller 40 so that the agricultural material flowing from spout 47 drops or moves further toward the rear of the container 4 (e.g., from the force of acceleration on the receiving vehicle). During or in preparation for the acceleration, if warranted by the estimated alignment of the spout discharge end 13A and the container perimeter or edges from the alignment module 24 or the image processing module 18, the vehicle controller 46 may suspend rotation temporarily of the auger 47 to avoid spilling agricultural material or missing the container 4, or the alignment module 24 provides command data via the wireless communication devices 48, 148 such that the propulsion controller 40 of the harvesting vehicle accelerates simultaneously (e.g., with equal magnitude and direction to the receiving vehicle) to maintain alignment (e.g., substantially the same alignment) between the container perimeter or edge and the spout discharge end 13A. The system 11, 111, 211 or propulsion controller 40 can temporarily increase a relative speed of the receiving vehicle relative to the harvesting vehicle if the image processing module 18 senses that a front volume of the cart 4 is currently filled to a target level or until the entire storage portion 93 reaches the target fill level. For instance, the system 11, 111, 211 can repeat the process of temporarily increasing the speed or velocity of the receiving vehicle relative to the harvesting vehicle during each sampling interval that the image processing module 18 senses that the front volume of the container 4 is currently filled to a target level or until the entire container 4 reaches the desired fill level.

In another configuration, as the container 4 of the receiving vehicle begins to become full, the agricultural material inside the container 4 was, is or becomes visible to the first imaging device 10, the second imaging device 12, or both. Next, the imaging device 10, 12 can scan or profile the height or level of the agricultural material inside the container 4. With an accurate profile of the height of level of the agricultural material inside the container 4, the system can then execute a container filling strategy that is appropriate for the situation.

The system and method is well-suited for controlling the steering and speed of the harvesting vehicle and the receiving vehicle via location determining receivers and wireless communication devices. Further, the system and method facilitates detection of how the container of the receiving vehicle is being filled to adjust the relative lateral alignment, and fore/aft alignment between the spout 47 or spout discharge end 13A and the container perimeter or edge to achieve uniform filling or uniformly distributed height level of agricultural material within the container 4. Uniform filling of agricultural material within the container 4 can be realized to minimize certain errors that might otherwise result from fatigue, inexperience or skill shortcomings of the operator of the vehicles, for example.

Figure 11:
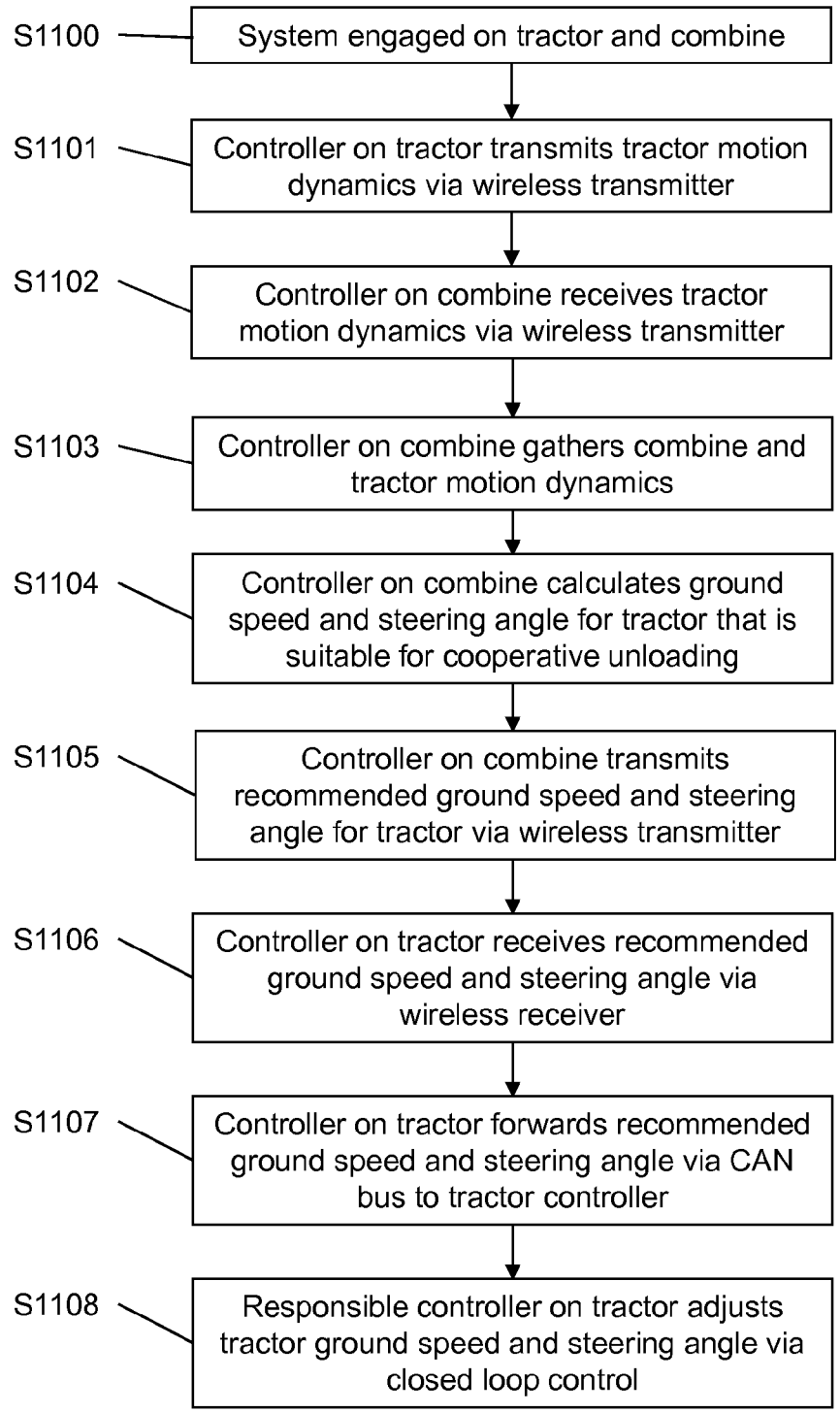
FIG. 11 is a process flow diagram of Machine Sync logic to control the relative position between the combine and grain cart.

The above described system architecture and software modules operatively execute a system referred to herein as Machine Sync. FIG. 11 is a process flow diagram of Machine Sync logic to control the relative position between the combine and grain cart. S1100: Operator in tractor engages system by pressing button on GUI in tractor. Combine operator can activate system when tractor gets close enough to the combine. Once the system is active, the tractor will accept ground speed and steering commands from the combine.

S1101: A GPS receiver that is mounted on the tractor transmits GPS location coordinates on tractor CAN bus. A controller on the tractor CAN bus that is connected to a wireless communications transceiver reads the tractor motion dynamics (GPS location, GPS heading, and yaw (turn) rate) from the CAN bus and transmits the motion dynamics data using the wireless transmitter.

S1102: A controller on the combine that is connected to a wireless communications transceiver receives the motion dynamics data transmitted from the tractor.

S1103: The same controller on the combine reads the combine motion dynamics information transmitted by a GPS receiver mounted on the combine. The controller feeds the tractor and combine motion dynamics into a control algorithm.

S1104: The control algorithm takes the tractor and combine motion dynamics as inputs and outputs a ground speed and steering angle that is suitable for the tractor to position itself (or maintain its position if already suitable) relative to the combine such that the relative position of the tractor to the combine is suitable for cooperative unloading while the combine continues to harvest.

S1105: The controller on the combine transmits the outputs of the control algorithm using the wireless transmitter on the combine.

S1106: The controller on the tractor that is connected to a wireless communications transceiver receives the recommended ground speed and steering angle transmitted from the combine.

S1107: The controller on the tractor transmits on the CAN bus the recommended ground speed and steering angle to another controller on the tractor that is responsible for closed loop control of the ground speed and steering angle.

S1108: The controller on the tractor controls the tractor ground speed and steering angle to the commanded values.

Figure 1A:
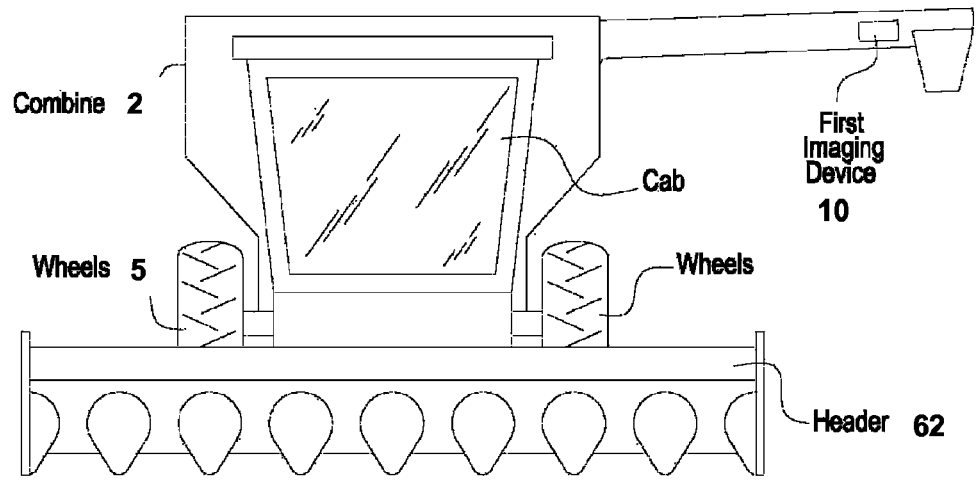
FIGS. 1A and 1B are front views of a combine and a forge harvester, respectively, illustrating many features of the present invention.
Figure 1B:
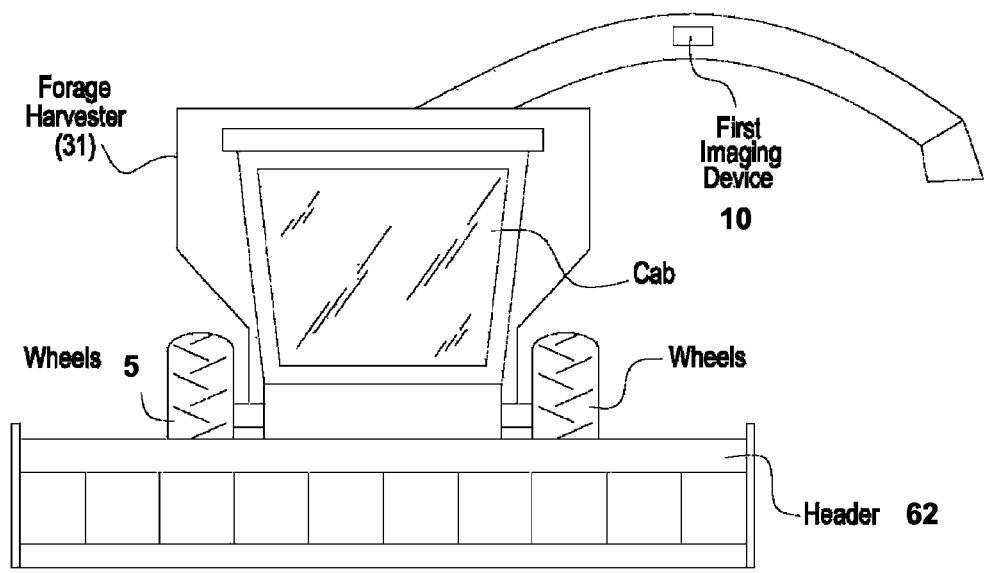
Figure 2:
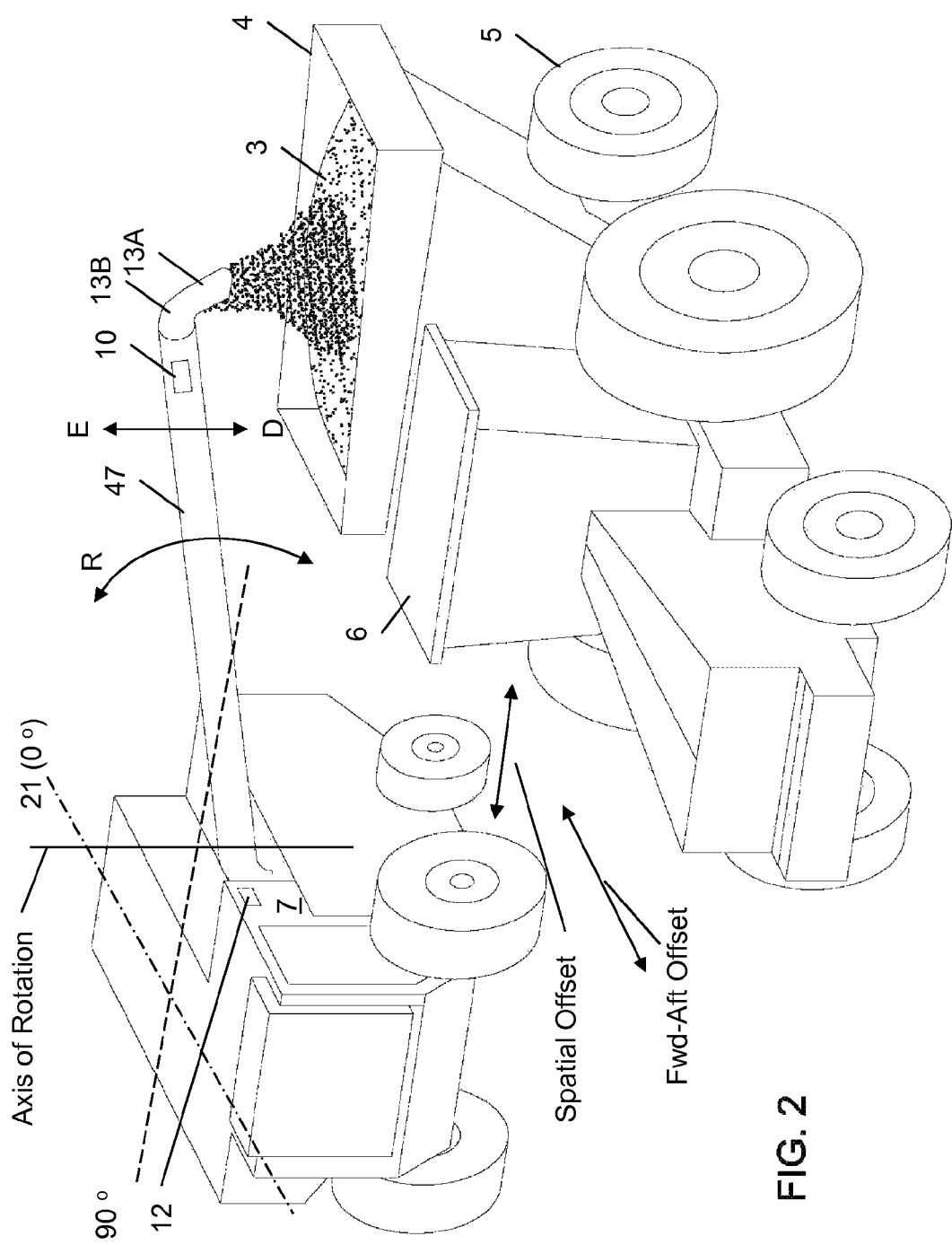
FIG. 2 is a perspective view of a combine unloading grain into a cart.
Figure 3:
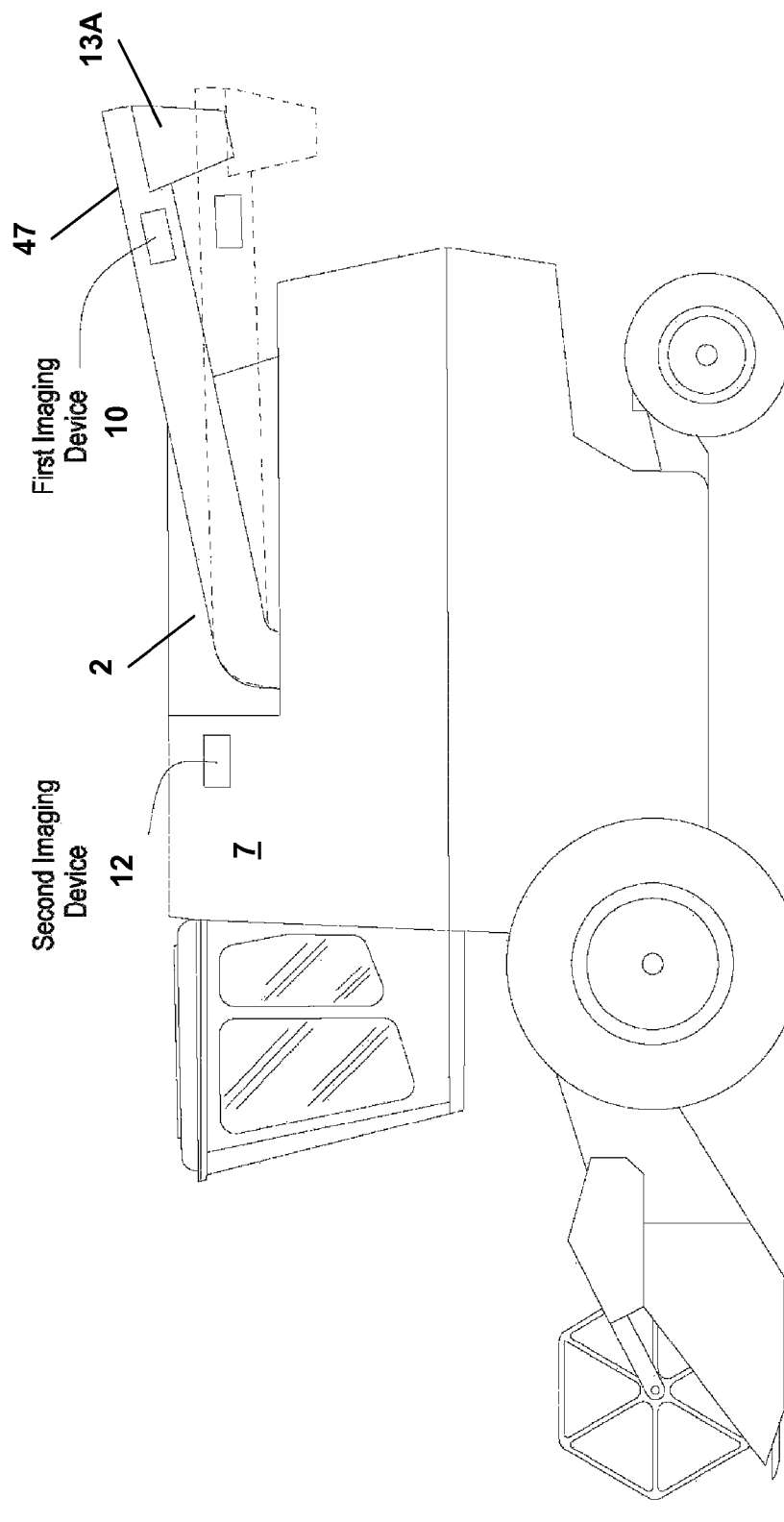
FIG. 3 is a side view of a combine illustrating the repositioning of a first imaging device as an auger moves up and down.
Figure 4:
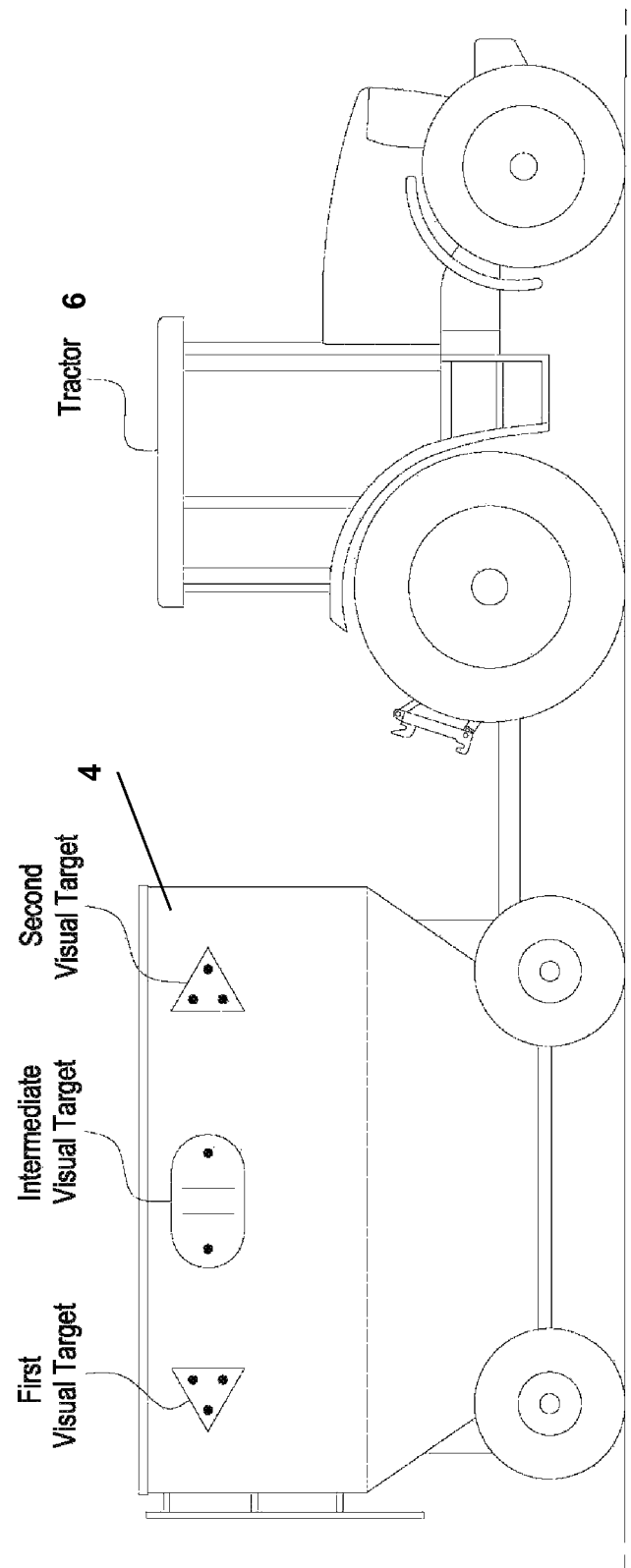
FIG. 4 is a side view of a tractor pulling a cart.

In the present invention illustrated in FIGS. 1A and 3, a stereo camera (first imaging device 10) is mounted on the unloading auger 47 of a combine 2 looking in the direction a grain cart 4 pulled by a tractor 6 (see FIG. 4) when the unloading auger 47 is rotated away from the chassis 7 of the combine 2. The stereo camera 10 is mounted sufficiently high to have visibility into the grain cart 4 (see FIG. 2). This gives the first imaging device 10 the ability to observe and profile the surface 3 of the grain as the grain cart 4 fills. FIG. 1B illustrates the first imaging device 12 on the spout of a forge harvester 31.

Additionally, another perception sensing device 12 (stereo camera—second imaging device) is mounted on the chassis 7 of the combine 2 looking directly to the left of the combine 2 (the side of the unloading auger 13) as illustrated in FIG. 3. The chassis mounted stereo camera 12 is further from the grain cart 4 than the auger mounted sensor 10 during unloading. This results in a better view of the grain cart 4 for the chassis mounted stereo camera 12 which facilitates easier tracking of the relative position of the grain cart 4 to the combine 2.

When the system is activated by the combine operator (button press on hydrohandle), the system determines if there is a grain cart 4 properly positioned beneath the boot 13A of the auger so that no grain will be spilled when grain begins to flow. If a cart 4 is detected and well-positioned, the system commands the combine 2 to turn on the unloading auger 47. The system continues to monitor the relative position between the combine 2 and grain cart 4 as well as the fill level. As the grain cart 4 begins to become full, the system uses the profile 3 of the grain surface to execute the operator-selected fill strategy (back-to-front, front-to-back, front-to-back to front, etc.). In order to execute the fill strategy, the system needs to unload grain into the areas of the cart 4 that have less grain. The system can adjust the unloading point by various means: command the auger 47 to rotate, command changes to the combine ground speed, command the combine operator to manually adjust the combine speed, and/or command the Machine Sync system (discussed above and in U.S. Pat. No. 7,062,381 and U.S. Pat. No. 8,060,283, both incorporated by reference herein) to command the tractor 6 to change its relative position. When the entire cart 4 is filled to the level selected by the operator, the system turns the unloading auger 47 off.

Camera Orientation—

Tilting the optical axis (not shown) of the chassis mounted stereo camera 12 down 10-25 degrees from horizontal has several potential benefits. Firstly, less of the sky is in the field of view of the stereo camera. This helps to create a more uniform image intensity profile and mitigates potential dynamic range issues due to bright sunlight. Secondly, the bottom part of the grain cart 4 becomes more visible. This enables the stereo camera 12 to capture images of the grain cart wheel(s) 5. The wheel 5 is a feature on the grain cart 4 that can be robustly tracked by image processing techniques. Thirdly, tilting the stereo camera 12 down may mitigate the accumulation of dust and other debris on the lens or external window of the camera 14.

Sensing Auger Rotation—

If the combine 2 is equipped with a rotary position sensor (not shown) to measure the rotation angle $\phi$ of the unloading auger, it is possible to fuse the data between the auger and chassis mounted stereo cameras 10, 12. This enables the system to create a virtual profile of the grain level distribution inside the grain cart 4 even when the entire surface 3 of the grain is not visible to the auger mounted stereo camera 10. Having this virtual profile of the entire surface 3 of the grain enables the system to intelligently execute a fill strategy for the grain cart (discussed above).

Relative Position Adjustment—

Generally, the system will attempt to utilize auger rotation $\phi$ as the primary means of adjusting the area that grain is unloaded into the grain cart 4. Utilization of proportional control valves (not shown) on the hydraulic cylinder (not shown) that rotates the auger 47 facilitates finer adjustments to the auger position. The end result is a cart 4 that is filled with a very even profile. Combines are typically equipped with hydraulic cylinders with valves that are not proportional. Systems on combines 2 with non-proportional valves will generally fill the grain cart with multiple discrete piles and have regions in the cart that are locally high (above the desired fill level) and locally low (below the desired fill level).

Figure 7:
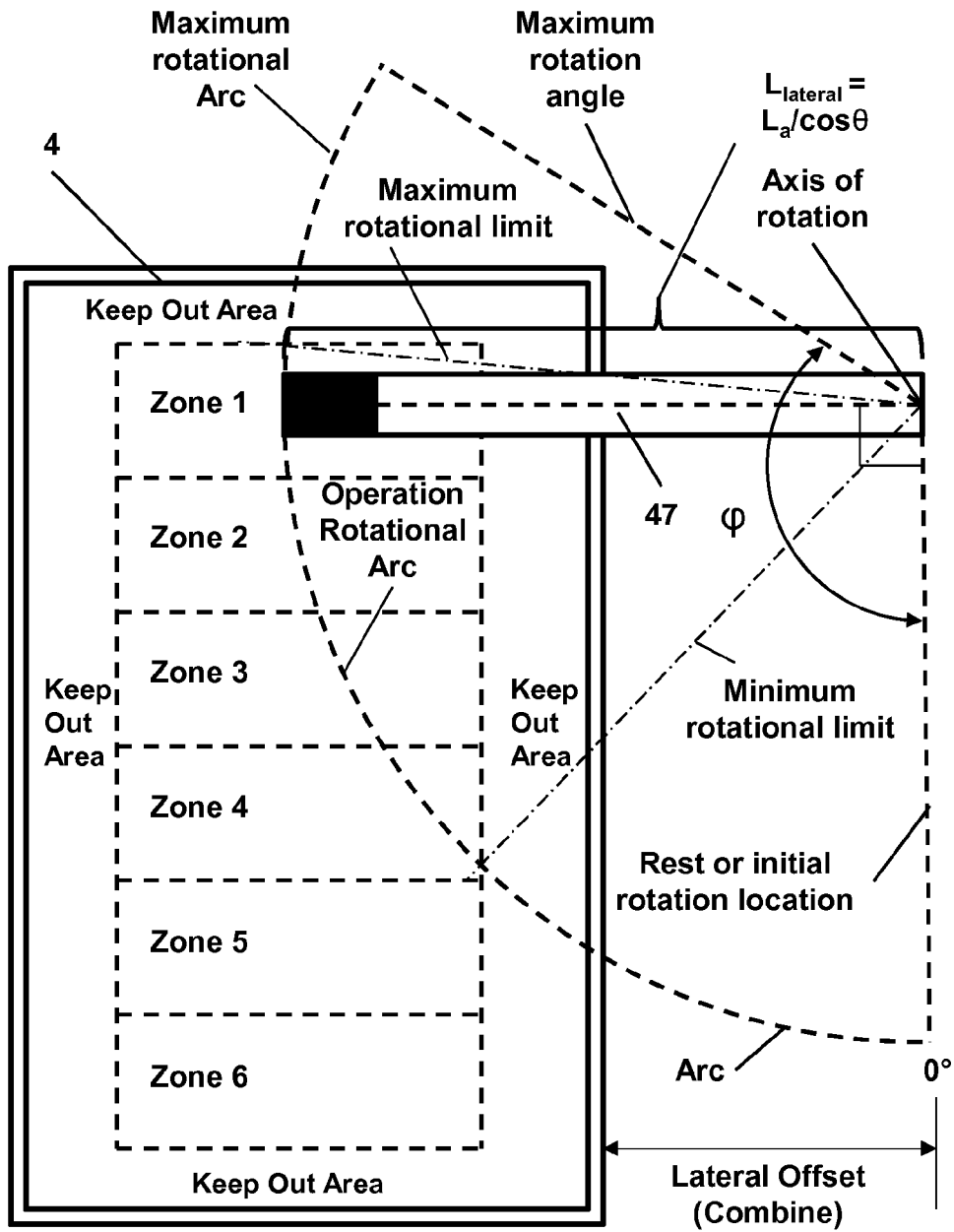
FIG. 7 is a top view of the cart illustrating fill zones of one fill strategy and auger rotational limits.

The default position for the auger 47 is at 90 degrees (perpendicular to the centerline 21 of the combine 2) as shown in FIGS. 2 and 7. The auger on a conventional combine 2 is only permitted to rotate another 17 degrees clockwise. However, the system is capable of operations up to any physical stop. The end 13B of the auger 47 traces an arc as it rotates about an axis of rotation (see FIG. 7). With these limitations, it is sometimes the case that a grain cart 4 cannot be filled using only auger rotation R. This is especially true for long grain carts 4. Therefore, the relative velocity between the combine 2 and grain cart 4 must change in order to fill a grain cart 4 to capacity. FIG. 7 also illustrates a forward-to-aft zoned cart (zones 1-6) suitable for a front-to-back fill strategy. This arrangement of zones also includes "keep out" zones along the sides of cart 4 to minimize spillover of the crop.

In particular, FIG. 7 is an illustration that shows how the lateral offset between a combine and the trailer can govern the rotational limits of the automated unloading system. The path that the tip of the boot of the unloading auger would follow as the auger is rotated from its rest position to its maximum rotation angle is shown by the dashed arc (maximum rotational arc) about an axis of rotation. The trailer has non-fillable (keep out) areas along the inner perimeter of the trailer. The system will not unload material in these areas due to an increased chance of spillage. The fillable area is the area between the non-fillable areas extending from the front of the trailer to the rear of the trailer. The system divides the fillable area into some number of zones (6 in this example) that are roughly the same size. The fillable area and non-fillable areas are determine by the fill strategy.

In this example, the combine unloading auger is rotated out to 90 degrees from its rest position. If the lateral offset and the fore/aft offset between the combine and the trailer remain constant while unloading, then the automated unloading system can unload material into zones 1, 2, 3, and 4. The system will set its lower rotational limit to an angle such that the tip of the boot of the auger remains over the fillable area of the trailer in the operation arc having a minimum rotational limit and a maximum rotational limit. The effective lateral length $L_{lateral}$ of the spout 47 is equal to the length $L_a$ of the spout 47 divided by the tangent of the elevation angle $\theta$ of the spout 47. Thereby, one method to determine a rotational limit of the discharge end of the spout within the maximum arc of the discharge end of the spout further takes into consideration at least one of the following: a current lateral offset between the storage portion and the transferring vehicle, a current height of the discharge end, the current rotational angle $\phi$ of the spout, the current elevation angle $\theta$ of the spout, or an effective lateral length of the spout.

Now consider a scenario where the fore/aft offset remains unchanged, and the lateral offset between the combine and the trailer becomes slightly shorter. The tip of the boot of the auger is now be positioned closer to the far edge of the trailer. The lower rotational limit is a lower angle, and the system could potentially unload into zone 5 as well.

Relative Position Adjustment by Controlling Combine Speed—

The speed of combine 2 can be controlled electronically when the combine is equipped with systems such as the Harvest Smart™ Feedrate Control System. In the feedrate control system, the ground speed of the combine 2 is automatically controlled by an electro hydraulic control valve (not shown). Ground speed is raised and lowered depending on the volume of crop that has entered the combine as sensed by a load pressure sensor (not shown) on the rotor (not shown) of the combine 2. To prevent plugging the header 62 of the combine 2, the combine speed must not exceed the maximum speed allowed by the feedrate control system notwithstanding the ground speed that is commanded by the automatic unloading system.

Relative Position Adjustment by Integration with the Machine Sync System—

The speed of the tractor 6 pulling the grain cart 4 can be controlled via the Machine Sync system. This would be the preferred method of changing relative position. When the automatic unloading system described herein is used in conjunction with Machine Sync, the combined system would behave as follows:

1. The automatic unloading system determines that a relative position adjustment is needed to fill in an area of the grain cart that is below the desired fill level.
2. The automatic unloading system sends a CAN message to the Machine Sync system commanding that the tractor 6 change its position relative to the combine 2.
3. The Machine Sync system on the combine 2 wirelessly transmits a message to the tractor 6 commanding a change in relative position.
4. The Machine Sync system on the tractor controls its speed and steering to execute the relative change in position.

Combining the automated unloading and Machine Sync systems could potentially automate the entire unloading process. The process steps include:

1. A tractor 6 pulling a grain cart 4 approaches a combine 2, and the Machine Sync system controls the tractor 6 to a position that matches the speeds of the tractor 6 and combine 2.
2. The automated unloading system automatically rotates the auger 47 out from its rest position on the combine 2 and turns on the unloading auger 47.
3. The automated unloading system executes the fill strategy and turns the auger 47 off when it reaches the desired fill level.
4. The Machine Sync system determines that the tractor 6 and grain cart 4 have pulled away from the combine 2.
5. The automated unloading system retracts the auger 47 to the rest position.

The end of the auger raises (elevates) as it rotates clockwise and lowers (descends) as it rotates counter-clockwise. In order to automatically extend or retract the auger 47, the system must ensure that the relative position between the grain cart 4 and combine 2 is such that the auger 47 will not make contact with the grain cart 4 as it rotates R. Any contact will likely result in damage and wear and tear on the auger assembly.

One embodiment of the present invention calculates the height of the end 13A or boot of auger 47 by the following equation:

$$H_b = H_r + \phi/90 * L_a * \tan \theta$$

wherein $H_b$=height of the boot, $H_r$=height of the boot in rest position, $\phi$=degrees auger has rotated from rest position, $L_a$=length of unloading auger, $\theta$=rise angle of auger as it rotates.

Example $H_r$=3 meters
$L_a$=6.9 meters
$\theta$=8 degrees

The above equation is an example and any suitable equation can be incorporated into the present invention.

Another major benefit of integrating the automated unloading system with the Machine Sync system is that the chassis-mounted stereo camera 12 is no longer required to track the relative position of the grain cart 4 with combine 2. The Machine Sync system already tracks changes in relative position by exchanging GPS coordinates via wireless communications between the combine 2 and the tractor 6.

Relative Position Adjustment by Tractor Operator Notification on Display—

If the tractor 6 and combine 2 do not have the Machine Sync system enabled, but they have requisite hardware for inter-vehicle communications, the automated unloading system could wirelessly transmit relative position adjustment commands from the combine 2 to the tractor 6. When the command is received by the display, the display could sound an audible signal to the tractor operator and display specific instructions about the magnitude and direction of the adjustment requested by the automated unloading system.

Relative Position Adjustment by Combine Operator Notification on Display—

Another method of relative position adjustment is simply for the automated unloading system to send a message to the combine display to request a relative position adjustment. The display would then sound an audible signal to the combine operator and display specific instructions about the magnitude and direction of the requested adjustment.

Target-Based (see FIG. 4) and Non-Target-Based Tracking—

The system is intended to track the relative position of the grain cart to the combine without the aid of fiducial markers (targets that are easily identified through image processing). However, creating a system that works without the aid of targets is more difficult to achieve for several reasons. The first reason is that there is a lot of diversity in the grain carts that the system may encounter in the field. Devising an image processing algorithm that works with all of carts is challenging. Secondly, some carts lack features that are useful for tracking purposes. Thirdly, some carts are more difficult to track at night without an exorbitant amount of illumination from the combine directed at the grain cart.

Cart Identification—

Besides providing easily identified tracking features or targets designed to encode information regarding the identity of the grain cart or wagon, a cart or container identification module (as discussed above and in U.S. Pat. No. 8,649,940, incorporated herein by reference) can be incorporated into the system architecture to identify cart features such as edges and sides. The cart identity could be tied to other information (grain moisture, seed variety, yield, etc.) that can be sensed by other sensors on the machine. Also, the cart identity could be used to automatically load system settings such as the desired fill level and fill strategy (front to back, back to front, etc.)

Illumination for Nighttime Operation—

In order for the system to work at night, additional lighting must be provided by the combine 2 to illuminate the grain cart 4 and make it visible to the stereo cameras 10, 12. The lights should be mounted in a position relative the cameras 10, 12 such that the backscattering of the light into the camera lenses is minimized. This is achieved by putting as much distance between the cameras 10, 12 and lights as possible and aiming the lights such that the direction they are pointed is significantly different from the optical axis of the cameras.

User Interface—

The system could also feature the ability for the customer to view a video feed from any of the cameras 10, 12 in the system on a display. The system could also send images to the display that are annotated by the image processing software (disclosed above) to outline and highlight features on the cart that the system is tracking.

Adjusting Relative Offset Between the Combine 2 and Grain Cart 4—

Figure 5:
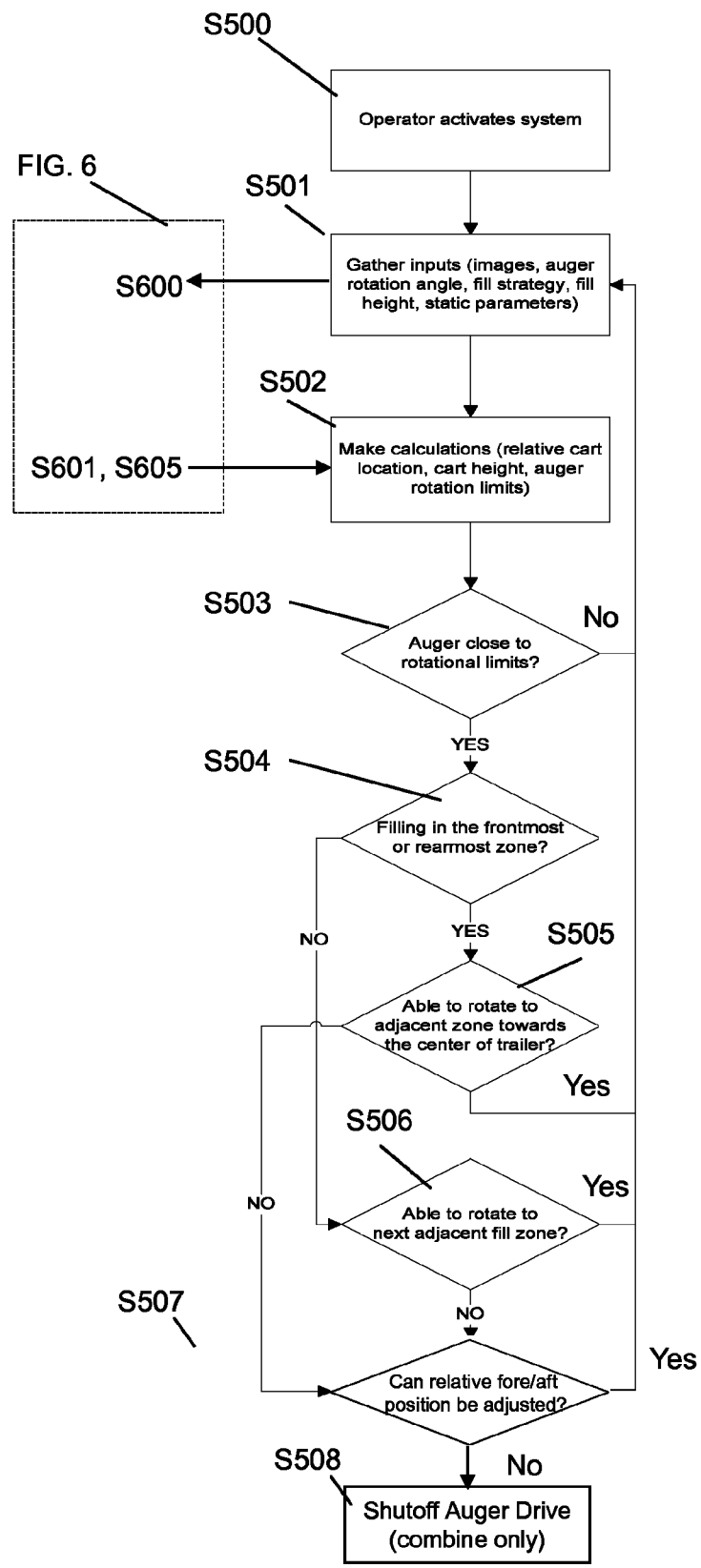
FIG. 5 is a process flow diagram of one embodiment of the present invention for adjusting relative offset between the combine and grain cart.

Now turning to FIG. 2, in order to achieve optimal system performance, it is beneficial to consider the auger rotation angle $\phi$ and the fore/aft offset between the combine 2 and the grain cart 4. FIG. 5 illustrates the method process steps for one embodiment of the present invention.

S500: The automated unloading system is activated by the operator by pressing a button on the hydrohandle. On the combine, the auger automatically rotates out to its maximum rotation angle (and therefore height). On the SPFH the spout automatically rotates to predefined location that is suitable for unloading to the left or right of the machine. The automated unloading system must then identify and start tracking a trailer prior to commencing active control.

S501: Once the automated unloading system is tracking a trailer, it gathers inputs such as the images from the stereo camera, the current auger or spout rotation angle, static parameters (machine dimensions, mounting location and orientation of the stereo cameras, etc.) and operator inputs to the graphical user interface (desired fill strategy and desired fill height). See FIG. 6 for image processing details.

S502: If on a combine, the system then makes calculations to determine the rotational limits of the auger to avoid interference with the trailer. This step is unnecessary on the SPFH, because the tilt and flap of the spout can be adjusted to avoid interference with the trailer, and the SPFH propels the harvested material through the spout at a high velocity. Instead, the rotational limits of the SPFH are predetermined in the system software. On the combine there are 3 possible scenarios in which the auger can interfere with the trailer. The first scenario is that the auger boot can interfere with the grain as it accumulates in the trailer. If the grain piles up to the discharge point on the boot, damage can occur to the auger or the auger drive system. The equations below will determine minimum auger boot height:

$$H_b > H_t + H_f$$

$H_b$=height of the boot $$-H_b = H_r + \phi/90 * L_a * \tan\theta$$

$H_t$=height of the trailer
$H_f$=height of the fill is used if the desired fill is to exceed the height of the trailer, otherwise use 0.

$$H_b = H_r + \phi/90 * L_a * \tan\theta > H_t + H_f$$

$$\phi > (90/(L_a * \tan\theta)) * (H_t + H_f - H_r)$$

The second scenario is that the auger boot can interfere with the trailer edge as the auger rotates.

$$H_b > H_t$$

$H_b$=height of the boot, where $H_b = H_r + \phi/90 * L_a * \tan\theta$
$H_t$=height of the trailer $$H_b = H_r + \phi/90 * L_a * \tan\theta > H_t$$

$$\phi > (90/(L_a * \tan\theta)) * (H_t - H_r)$$

Figure 7A:
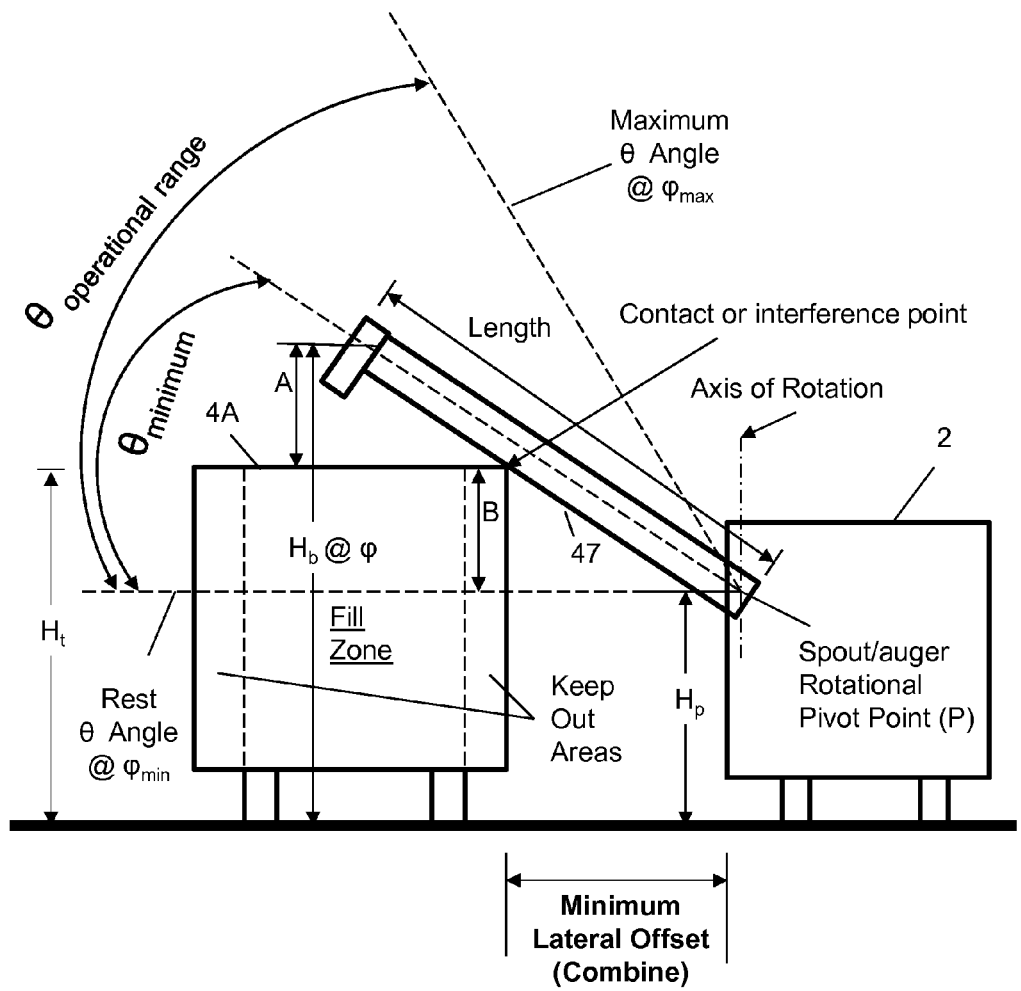
FIG. 7A is a rear view of a combine alongside a cart illustrating minimum distances and auger angle to avoid contact of the auger with the top edge of the cart.

The third scenario is that the auger or spout 47 can interfere with or contact the top edge 4A of the trailer or storage portion 4 as illustrated in FIG. 7A. To determine an appropriate lateral offset to assure no contact between the auger or spout 47 with the top edge 4A of trailer or storage portion 4, the lateral offset must be greater than the vertical distance B from a spout rotational pivot point P to the top edge 4A of the storage portion ($B = H_t - H_p$, where $H_t$ is the height of the top edge of the trailer 4 above the ground, $H_p$ is the height of the spout/auger rotational pivot above the ground) divided by the tangent of the current elevation angle $\theta$ of the spout (minimum lateral offset). The processor executes the following steps to assure that there is no interference or contact between the auger/spout 47 and the top edge of the trailer:

determining a vertical distance from a spout rotational pivot point to the top edge of the storage portion;

calculating a tangent of the current elevation angle $\theta$ of the spout;

dividing the vertical distance by the tangent of the current elevation angle $\theta$ of the spout to calculate a minimum lateral offset; and adjusting the current lateral offset to a subsequent lateral offset when the current lateral offset is greater than the minimum lateral offset.

First, the system uses stereo vision ranging to determine the relative location of the trailer to the combine, the trailer height, and the trailer length. The system calculates the rotational limits of the auger using static parameters, the desired fill height (if it is set above the top plane of the trailer), the trailer height, and the relative distance of the trailer to the combine.

S503: The system then compares the current auger or spout rotation angle to the rotational limits. If the auger or spout is determined to be at or near the rotational limits, the process proceeds to the next step. If not, the system loops back to gather inputs and the auger rotational limits are recalculated again. It is necessary to periodically evaluate the rotational limits, because changes in terrain could change the height of the trailer relative to the combine or SPFH or the lateral offset of the trailer may change. On the combine, changes in lateral offset can affect the rotational limits, because the auger rotates in an arc and the harvested material is propelled downward at a low velocity.

S504: The system then determines if the harvested material is being unloaded into the front most or rearmost zone of the cart.

S505: Once the system determines that harvested material is being unloaded into the front most or rearmost zone of the cart, the system determines if it can rotate towards the center of the cart without exceeding the rotational limits. If the system cannot rotate towards the center without exceeding the rotational limits, there is an increased chance of grain spillage if the relative velocity of the trailer changes suddenly. For example, consider the scenario in which the system is filling the front most zone of the cart and the spout or auger is rotated to its lower rotational limit. If the ground speed of the trailer suddenly decreases, harvested material will over the front edge of the trailer, and the system can only turn off the auger drive on the combine to limit the spillage. However, if the auger or spout is not at its lower rotational limit as it unloads into the front most zone and the ground speed of the trailer suddenly increases, the system can rotate the auger or spout towards the rear of the trailer to mitigate or prevent spillage.

S506: The system then considers the desired fill strategy to determine the next zone in the trailer that the system will unload into when the current zone reaches the desired fill level. The system calculates the auger or spout angle required to unload into the next fill zone. If the angle required to unload into the next zone violates the rotational limits, the system will not be able to rotate the spout when the zone that it is currently unloading into becomes filled to the desired fill level. On the combine, the system will be forced to turn off the auger drive when this occurs. On the SPFH, the system will overfill the zone that is currently being unloaded into until the next zone can be reached without violating the rotational limits of the spout.

S507: The system then takes measure to adjust the relative fore/aft offset of the combine or SPFH to the trailer. If Machine Sync is present, the combine or SPFH can command the tractor to temporarily change its ground speed until the next fill zone is within the rotational limits or, in the case the that the system is unloading into the front most or rearmost zone of the trailer, the adjacent zone in the cart is within the rotational limits. If Machine Sync is not present, the system can adjust the ground speed of the combine or SPFH. If Machine Sync is not present and the system is unable to control the ground speed of the combine or the SPFH, the system can send a CAN message to the graphical user interface to sound an alert to notify the operator that the system has reached its rotational limits. The system or operator will shut off the auger drive (S508) if the fill strategy is complete or other limits are violated and would result in spill over if continued.

For instance, when executing a back-to-front fill strategy, if the auger 47 is fully rotated to maximum extension and grain is being unloaded into the center of the grain cart 4, the system will not be able to extend the auger's rotation φ any further to fill the front of the cart 4. Instead, the system should adjust the fore/aft offset between the vehicles (via Machine Sync or combine speed control) such that the auger 47 is not fully extended when filling the center of the grain cart. Auger rotation φ is more responsive than adjusting fore/aft offset, and it is important to be able to unload grain into another area of the cart 4 as quickly as possible when the current area reaches its desired fill level.

Another reason to consider the rotation angle φ and fore/aft offset is to ensure that grain spillage can be easily mitigated. If the auger is fully extended as grain is being unloaded in the rear of the grain cart 4, and the forward velocity of the grain cart 4 is greater than the combine 2, the only recourse the automated unloading system has to mitigate grain spillage is to shut off the unloading auger 47. If the auger 47 is not fully rotated in this scenario, it can fully rotate the auger 47 as it shuts off the flow to further reduce the chances of grain spillage.

A stereo camera (not shown) could also be mounted on the cab of a tractor.

Overcoming Conditions that Diminish System Performance—

Figure 6:
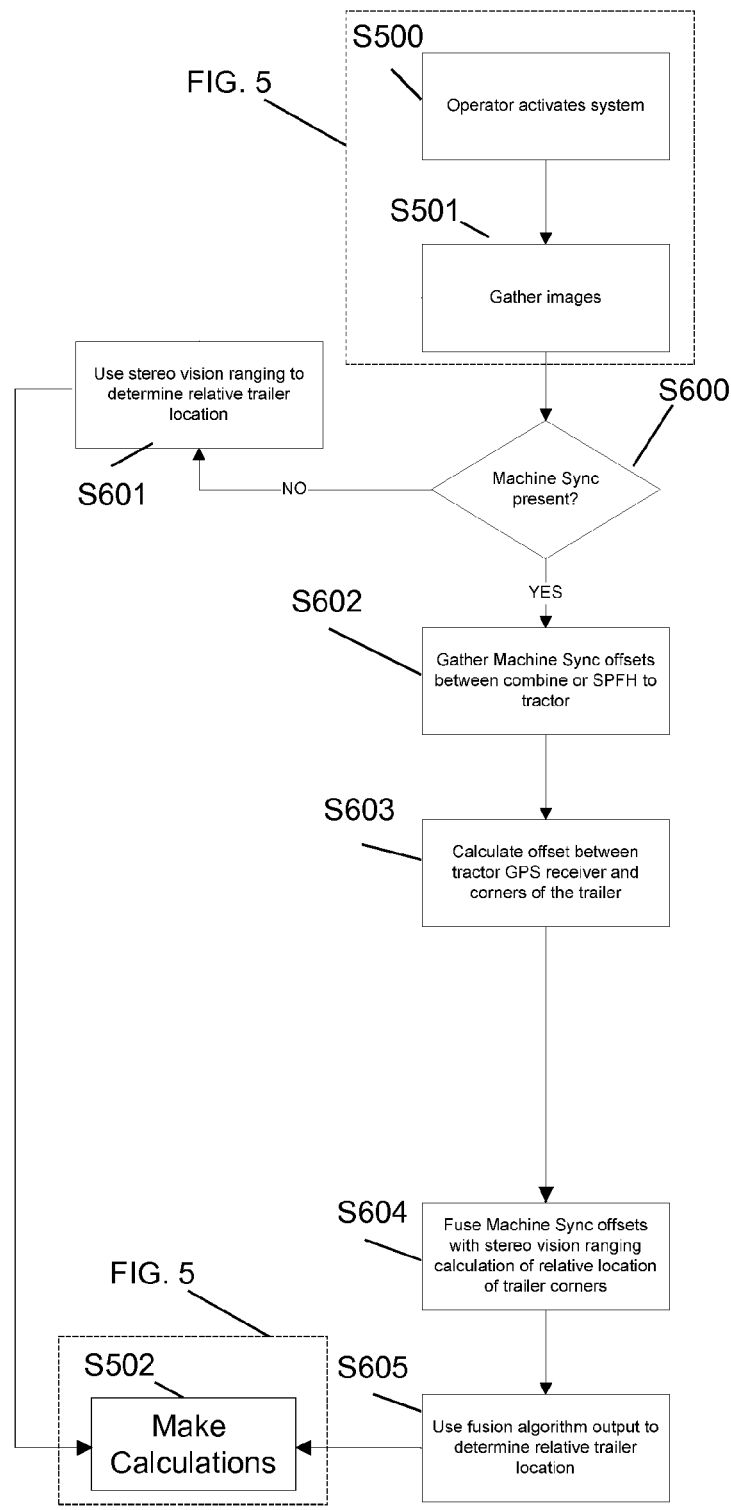
FIG. 6 is a process flow diagram of one embodiment of the present invention for overcoming conditions that diminish system performance.

Occasionally, the system may lose its ability to track the relative position of the combine to the grain cart or sense fill level. Multiple cameras are used to improve the accuracy and robustness of cart tracking and fill measurement. Each camera can be positioned on the body (chassis) of the combine or forage harvester or spout/auger end to optimize the system function for cart tracking and fill measurement. Data fusion algorithms are used to register and combine the output of the multiple cameras to product a single, accurate, and robust measurement of the cart position and fill level. All the information on the cart positions are integrated using a filtering algorithm, such as a Kalman filter, to produce the estimate on the cart position and orientation. While all the information on the fill level are integrated using a model based filter to produce an accurate measurement of the fill level. One embodiment of the present invention includes a built-in switchover to handle failure in one or more cameras. If one or more cameras fail and are disabled during operation, then the filtering and registration algorithms automatically uses information only from the remaining camera or Machine Sync data, if Machine Sync is available. The same switchover functionality can also be used to handle occlusion that blocks one or more camera views. Failure detection uses consistency in the measurements from multiple cameras. Use of the cart tracking information to perform selective stereo processing for fill measurement and better real-time performance. FIG. 6 illustrates the method process steps for one embodiment of the present invention.

S600: After the images are gathered in S501 of FIG. 5, the system determines if Machine Sync present. The presence of Machine Sync is detected by monitoring for specific Machine Sync messages on the CAN bus. If so, then the process continues to S602. Else, the system will return to S502 of FIG. 5 to make calculations using stereo vision ranging to determine relative trailer location (S601).

S602: Gather Machine Sync offsets between combine or SPFH to tractor.

S603: Machine Sync calculates the relative location of the GPS receiver on the tractor to the location of the GPS receiver on the combine or SPFH. Since the location of the GPS receiver on the combine or SPFH is known, the relative offset between the GPS receiver on the tractor and the combine can be translated to a reference point on the vehicle (e.g. the center of the rear axle). The automated unloading system first calculates the relative location of the corners of the trailer to the stereo camera. Since the location of the camera on the combine or SPFH is known, the relative location of the trailer corners can be translated to a reference point on the vehicle (e.g. the center of the rear axle). Once the location of the GPS receiver on the tractor and the corners of the trailer are translated to the same reference frame, the offset between the GPS receiver and the trailer corners can be calculated.

S604: There are myriad sensor fusion possibilities when the Machine Sync offsets and the automated unloading system offsets are translated to the same coordinate frame. Here are a few: 1. The system could simply use the offset from the data source that has the higher confidence. Machine Sync could have low confidence when the GPS receiver is tracking few satellites, when GPS signal strength is weak, or interference prevents the wireless radios from communicating. The automated unloading system could have low confidence when the camera is dirty, there is dust in the air, or the trailer is a long distance from the camera (stereo vision ranging precision degrades quadratically with distance). For example, Machine Sync confidence could be the product of the GPS signal strength time of the combine (0-100%) times the GPS signal strength of the tractor (0-100%) times the signal integrity of the communications link (0-100%). The confidence of the vision processing, portion of the system could be the percentage of features that the system is able to track from the previous image frame to the current image frame or related. 2. The system could use the offsets calculated by the vision processing portion of the system as long as it has high confidence and revert to using the Machine Sync offsets when vision processing confidence is poor. 3. The offset estimates from Machine Sync and the vision processing portion of the system could be tightly fused in a Kalman filter. The Kalman filter will weight the contributions from Machine Sync and the vision processing portion of the system based on the reported confidence and error model of each data source.

S605: Use fusion algorithm output to determine relative trailer location. The system will return to S502 of FIG. 5 to make calculations using the fused data.

Potential causes include:

Thick dust between the combine and grain cart make it difficult or impossible for the grain tank (chassis) camera 12 to see identifying features on the grain cart. This condition can occur when harvesting with a tailwind.

Bright sunlight from a setting sun shining directly into the grain tank camera 12 saturates the camera imager.

Dirt or other residue builds up on the camera window.

In the event of thick dust, the grain tank camera 12 cannot see the grain cart 4. If the automated unloading system cannot track the grain cart 4, it must shut off the auger 47, and the operator must unload manually. The automated unloading system could detect a loss of tracking from the grain tank camera 12 and use the auger camera 10 to detect features on the grain cart 4 and track those features until the grain tank camera 12 is able to track again. The auger camera 10 is better able to detect features on the grain cart 4, because it is closer to the grain cart 4 and has less dust obscurant to see through.

In the event of bright sunlight from a setting sun, the grain tank camera 12 could become saturated and lose the ability to track. The system could also use the auger camera 10 to track features on the grain cart 4 during such occurrences. The auger camera 10 is much less likely to become saturated by sunlight, because it has a steeper downward viewing angle than the grain tank camera 12.

If automated unloading system is used in conjunction with Machine Sync, the relative position between the combine 2 and the grain cart 4 can be calculated using GPS data from the combine 2 and tractor 6 pulling the grain cart 4. This calculated relative position could be an input to a Kalman filter with the relative position that is sensed by the grain tank camera 12. In the event that the grain tank camera 12 is compromised by dust or direct sunlight, the relative position calculated from the GPS data could be weighted much more heavily in the Kalman filter.

The automated unloading system can also measure the amount of residue on the camera window. The system periodically captures and analyzes an image for signs of residue build up on the lens. There are a number of commercially available image processing algorithms designed to compute an image sharpness or blurriness metric that could be correlated to the dirtiness of the camera window. The measured dirtiness can then be reported to the operator on the user interface. The operator can then decide if it is necessary to clean the window immediately or to wait for a more convenient opportunity.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A system for facilitating transfer of agricultural material from a transferring vehicle to a receiving vehicle, the system comprising:
   a spout comprising:
      a length, a rotational end pivotally connected to the transfer vehicle, and a discharge end,
      a rotational actuator to rotate the spout about a vertical axis of rotation from a rest position to a maximum position along a maximum arc,
      a vertical actuator to vertically elevate and lower the discharge end between a rest position height to a maximum position height,
      one or more sensors to determine a current rotational angle $\phi$ of the spout and a current elevation angle $\theta$ of the spout, and
      an auger drive to transfer agricultural material from the transferring vehicle to the receiving vehicle through the spout;
   the receiving vehicle comprising a propelled portion for propelling the receiving vehicle and a storage portion for storing agricultural material, wherein the storage portion comprising a front side, a rear side, and two longitudinal sides joined at corners, wherein each side has a top edge;
   a first imaging device connected to the spout and facing towards the storage portion of the receiving vehicle, wherein the first imaging device collects first image data;
   a second imaging device connected to a chassis of the transferring vehicle and facing towards the storage portion of the receiving vehicle, wherein the second imaging device collects second image data; and
   an image processing module associated with the transferring vehicle, wherein the image processing module comprises a processor for executing software to position the discharge end of the spout with respect to the front side or the rear side or the top edge of the storage portion of the receiving vehicle based on a fill strategy using the first image data and the second image data.

2. The system according to claim 1, wherein the transferring vehicle and the receiving vehicle each comprise a location determining receiver and a wireless communication device, and wherein the processor further processes data from the receiving vehicle location determining receiver transmitted between the wireless communication devices, and data from the transferring vehicle location determining receiver to determine current offsets.

3. The system according to claim 2, wherein the processor further executes the step of fusing the current forward-to-aft offset and the current lateral offset with the first image data and the second image data to calculate a relative location of corners of the storage portion.

4. The system according to claim 3, wherein the processor further executes the step of determining a relative location of the storage portion.

5. The system according to claim 2, wherein the processor executes the step of determining a rotational limit of the discharge end of the spout within the maximum arc of the discharge end of the spout.

6. The system according to claim 5, wherein the rotational limit is defined as a portion of the maximum arc traversing fillable zones defined by the fill strategy.

7. The system according to claim 5, wherein the step of determining a rotational limit of the discharge end of the spout within the maximum arc of the discharge end of the spout further comprises the step of determining at least one of the following a current lateral offset between the storage portion and the transferring vehicle, a current height of the discharge end, the current rotational angle $\phi$ of the spout, the current elevation angle $\theta$ of the spout, or an effective lateral length of the spout.

8. The system according to claim 7, wherein the step of determining a rotational limit of the discharge end of the spout within the maximum arc of the discharge end of the spout further comprises the step of determining an interference point along the length of the spout with the top edge of the storage portion.

9. The system according to claim 8, wherein the step of determining an interference point of the spout and the top edge of the storage portion comprises the steps of:
   determining a vertical distance from a spout rotational pivot point to the top edge of the storage portion;
   calculating a tangent of the current elevation angle $\theta$ of the spout;
   dividing the vertical distance by the tangent of the current elevation angle $\theta$ of the spout to calculate a minimum lateral offset; and
   adjusting the current lateral offset to a subsequent lateral offset when the current lateral offset is greater than the minimum lateral offset.

10. The system according to claim 5, wherein the processor further executes the step of determining whether the discharge end of the spout is close to the rotational limit.

11. The system according to claim 10, wherein the processor further executes the step of determining whether the discharge end of the spout is filling in the front most or rear most fillable zone.

12. The system according to claim 11, wherein the processor further executes the step of determining whether the discharge end of the spout is able to rotate to one or more adjacent fillable zones.

13. The system according to claim 12, wherein the processor further executes the step of adjusting the current forward-to-aft offset to a subsequent forward-to-aft offset when the spout is able to rotate to one or more adjacent fillable zones.

14. The system according to claim 12, wherein the processor further executes the step of adjusting the current forward-to-aft offset to a subsequent forward-to-aft offset when the spout is not able to rotate to one or more adjacent fill zones.

15. The system according to claim 1 wherein the first imaging device and the second imaging device each comprise a stereo vision camera.

16. The system according to claim 1, wherein the processor executes the step of determining a rotational limit of the discharge end of the spout within the maximum arc of the discharge end of the spout.

17. The system according to claim 16, wherein the rotational limit is defined as a portion of the maximum arc traversing fillable zones defined by the fill strategy.

18. The system according to claim 16, wherein the step of determining a rotational limit of the discharge end of the spout within the maximum arc of the discharge end of the spout further comprises the step of determining at least one of the following a current lateral offset between the storage portion and the transferring vehicle, a current height of the discharge end, the current rotational angle $\phi$ of the spout, the current elevation angle $\theta$ of the spout, or an effective lateral length of the spout.

19. The system according to claim 18, wherein the step of determining a rotational limit of the discharge end of the spout within the maximum arc of the discharge end of the spout further comprises the step of determining an interference point along the length of the spout with the top edge of the storage portion.

20. The system according to claim 19, wherein the step of determining an interference point of the spout and the top edge of the storage portion comprises the steps of:
   determining a vertical distance from a spout rotational pivot point to the top edge of the storage portion;
   calculating a tangent of the current elevation angle $\theta$ of the spout;
   dividing the vertical distance by the tangent of the current elevation angle $\theta$ of the spout to calculate a minimum lateral offset; and
   adjusting the current lateral offset to a subsequent lateral offset when the current lateral offset is greater than the minimum lateral offset.

21. The system according to claim 16, wherein the processor further executes the step of determining whether the discharge end of the spout is close to the rotational limit.

22. The system according to claim 21, wherein the processor further executes the step of determining whether the discharge end of the spout is filling in the front most or rear most fillable zone.

23. The system according to claim 22, wherein the processor further executes the step of determining whether the discharge end of the spout is able to rotate to one or more adjacent fillable zones.

24. The system according to claim 23, wherein the processor further executes the step of adjusting the current forward-to-aft offset to a subsequent forward-to-aft offset when the spout is able to rotate to one or more adjacent fillable zones.

25. The system according to claim 23, wherein the processor further executes the step of adjusting the current forward-to-aft offset to a subsequent forward-to-aft offset when the spout is not able to rotate to one or more adjacent fillable zones.

* * * * *